United States Patent [19]
Nakajima et al.

[11] Patent Number: 4,841,375
[45] Date of Patent: Jun. 20, 1989

[54] IMAGE-RESOLUTION CONVERSION APPARATUS FOR CONVERTING A PIXEL-DENSITY OF IMAGE DATA

[75] Inventors: Shunichi Nakajima; Koji Izawa, both of Yokohama, Japan

[73] Assignee: Kabushiki Kaisha Toshiba, Kawasaki, Japan

[21] Appl. No.: 38,362

[22] Filed: Apr. 14, 1987

[30] Foreign Application Priority Data

May 29, 1986 [JP] Japan ................. 61-124209
May 29, 1986 [JP] Japan ................. 61-124211
May 29, 1986 [JP] Japan ................. 61-124212

[51] Int. Cl.$^4$ ............................................. H04N 1/00
[52] U.S. Cl. .................................. 353/280; 358/287; 358/284
[58] Field of Search ............... 358/280, 285, 287, 284

[56] References Cited

U.S. PATENT DOCUMENTS 4,644,409 2/1987 Flichs ........................ 358/287

Primary Examiner—Edward L. Coles, Sr.
Attorney, Agent, or Firm—Cushman, Darby & Cushman

[57] ABSTRACT

Image data having a predetermined pixel density, and output from a personal computer, is supplied to an image-resolution conversion apparatus connected to a printer having a pixel density different from the above predetermined pixel density. In the image resolution conversion apparatus, the pixel density of the input image data is converted, by a pixel converter, to a pixel density matching that of the printer, according to a conversion ratio set by a pixel-density conversion ratio setter for setting a ratio of pixel-density conversion, from the pixel density of the personal computer to that of the printer. The pixel-density converted image data is then supplied to and printed by the printer.

24 Claims, 17 Drawing Sheets

| TERMINAL NO. | CONVERSION RATIO | |
|---|---|---|
| | MAIN SCANNING DIRECTION | SUB-SCANNING DIRECTION |
| PC1 | 2 | 2 |
| PC2 | 2 | 2 |
| ⌇ | ⌇ | ⌇ |
| G Ⅲ | 1.97 | 2.05 |
| G Ⅳ | 1 | 1 |

| TERMINAL NO. | CONVERSION RATIO | |
|---|---|---|
| | MAIN SCANNING DIRECTION | SUB-SCANNING DIRECTION |
| PC1 | 2 | 2 |
| PC2 | 2 | 2 |
| ≈ | ≈ | ≈ |
| G III | 1.97 | 2.05 |
| G IV | 1 | 1 |

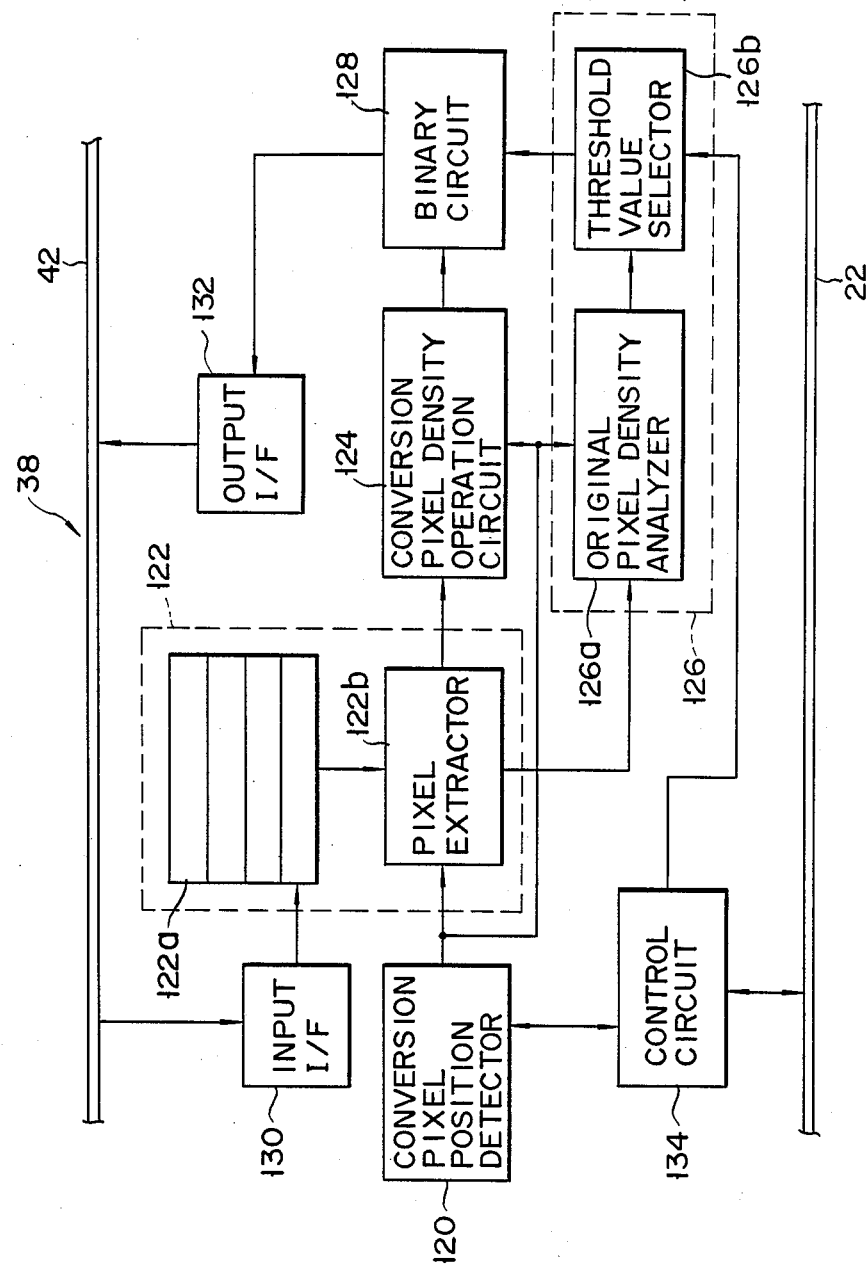

F I G. 8
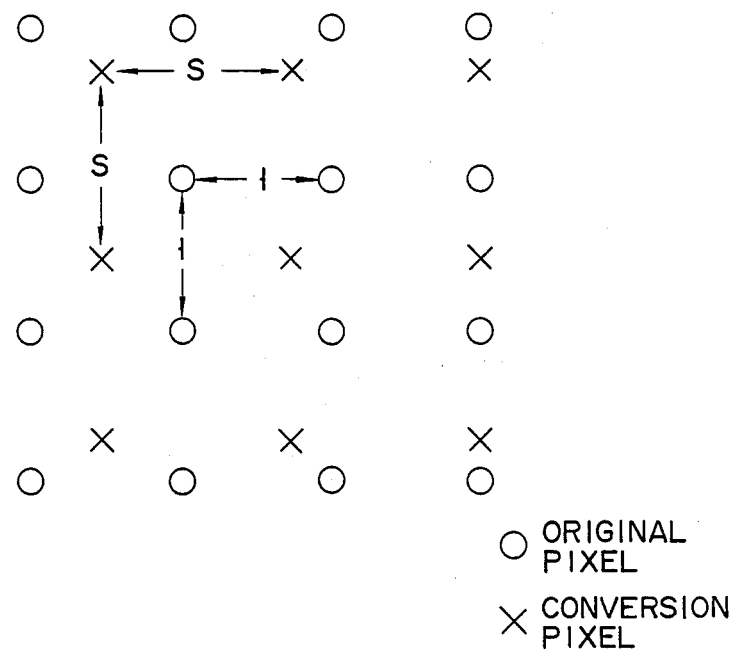
F I G. 9
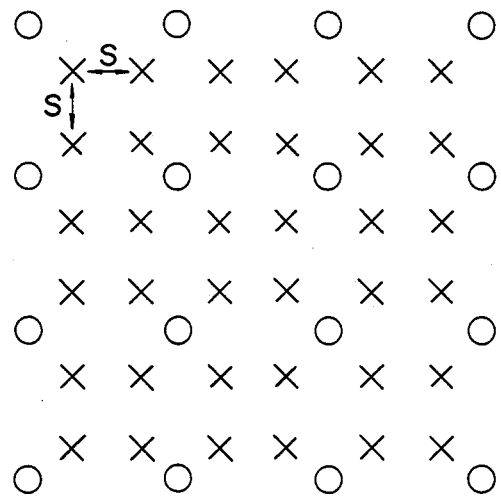

F I G. 12A
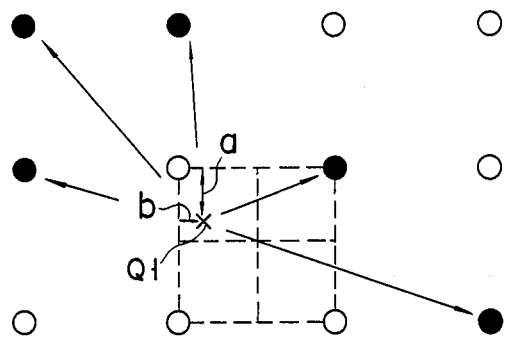
F I G. 12B
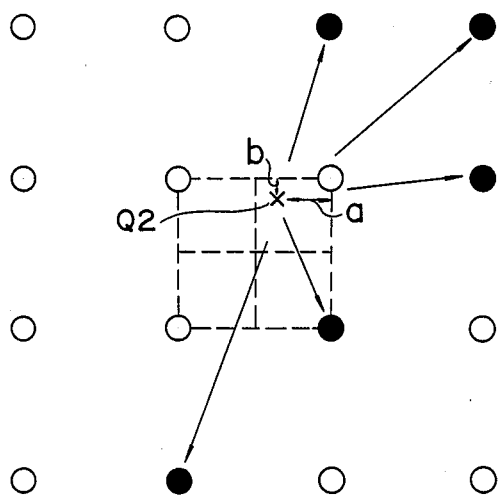

F I G. 16
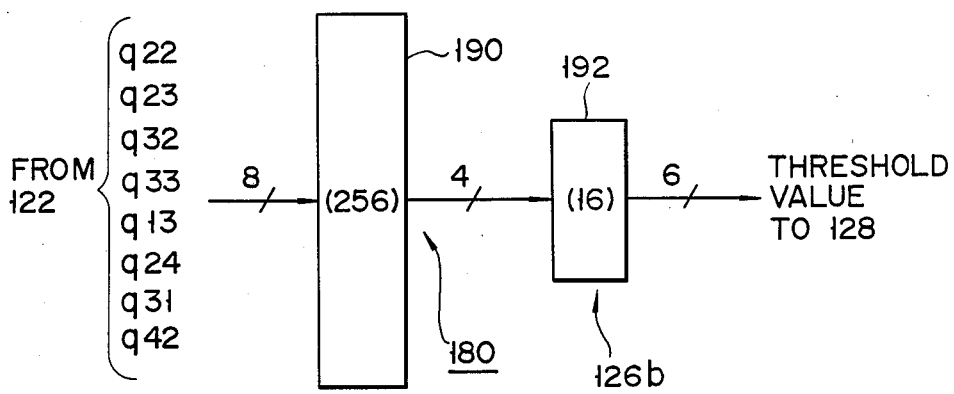
F I G. 17
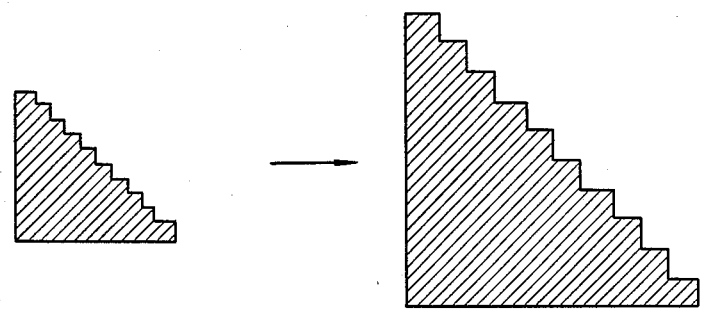
F I G. 18
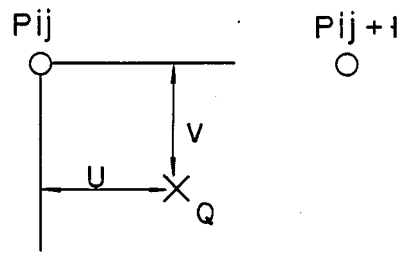

THRESHOLD VALUE = 0.5

THRESHOLD VALUE = 0.35

THRESHOLD VALUE = 0.5

THRESHOLD VALUE = 0.75(X1)
0.25(X2)

| PATTERN | THRESHOLD VALUE |
|---|---|
| BLACK DIAGONAL | 0.35 |
| WHITE DIAGONAL | 0.65 |
| BLACK L | 0.75 |
| WHITE L | 0.25 |
| OTHERS | 0.5 |

F I G. 26
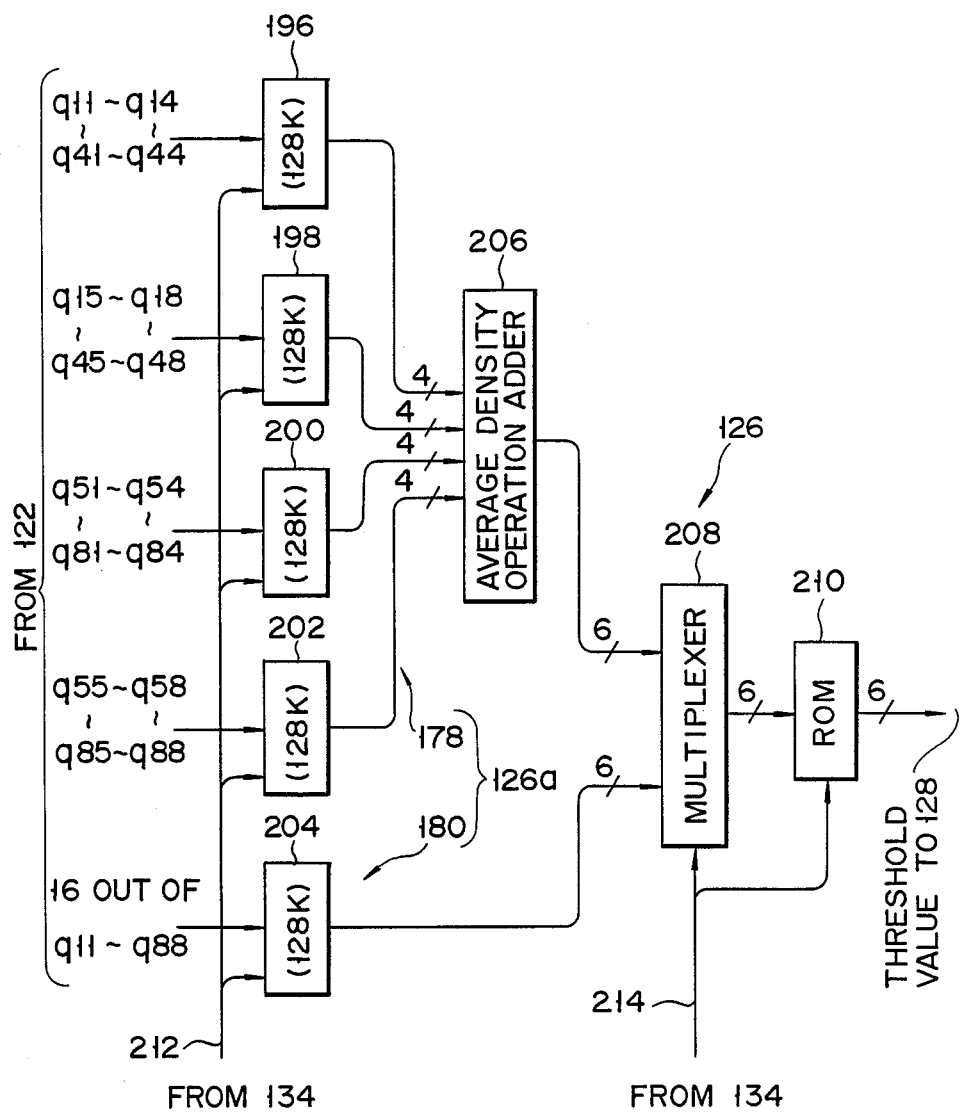

IMAGE-RESOLUTION CONVERSION APPARATUS FOR CONVERTING A PIXEL-DENSITY OF IMAGE DATA

BACKGROUND OF THE INVENTION

The present invention relates to an image-resolution conversion apparatus for converting image data items having different pixel densities, supplied from image data-output devices such as a personal computer and a facsimile system, so as to match the pixel density of a particular printer system, and to a printer system including the above image-resolution conversion apparatus.

Printer systems capable of printing image data (e.g., graphic data) in addition to character data have become popular and widely used. Printer systems of this type, which have high printing resolution (pixel density) and can print information on normal paper, include an electrophotographic printer system having a laser or a light-emitting diode (LED) as a light source, a thermal transfer printer using a heat-sensitive head, and an ink-jet printer. The resolution of these various printers ranges from 200 to 480 dots/inch. The normal arrangement in this type of printer system is to employ a main scanning resolution and a subscanning resolution.

The resolution of output images differ from that in image data-output devices, such as personal computers and wordprocessors. For this reason, when a printer having a higher resolution than that of the image data-output device is used, the performance of the printer cannot be utilized to the maximum. In the worst case, some systems fail to allow connection between the printer and the image data-output device.

The conventional printer system for connection to an image information output device such as a personal computer or a wordprocessor must have a resolution which matches that of the image data-output device. If a user wishes to use a plurality of image data-output devices having different resolutions, a plurality of corresponding printer systems are required, thus resulting in high-cost system configurations.

In a G III mode facsimile system, used as an image data-output device, the pixel density of an image along the main scanning direction differs from that along the subscanning direction. Consequently, it is difficult for a conventional printer system to appropriately print image data received from such a facsimile system.

SUMMARY OF THE INVENTION

The present invention has been developed in consideration of the above situation, and has as its object to provide an image-resolution conversion apparatus which can convert the resolution of an image, received from an image data-output device, to one matching a printing means in a printer system, when the resolution of the image data-output device differs from that of the printing means. It is another object of the present invention to provide a printer system capable of appropriately printing image data, even if the resolution of the image data-output device differs from that of the printing means.

It is yet another object of the present invention to provide a printer system capable of appropriately printing image data whose pixel density differs along the main scanning direction from that along the subscanning direction.

According to the present invention, there is provided an image-resolution conversion apparatus for converting a pixel-density of an image data, which comprises input means for receiving image data of various pixel densities; selection means, having a plurality of data items representing ratios of pixel-density conversion, for converting the pixel density of the image data to another predetermined pixel density, for selecting the pixel-density conversion ratio data in response to the pixel density of the image data received by the input means; and pixel-density converting means for receiving the image data received by the input means and the pixel-density conversion ratio data from the selection means, performing a predetermined arithmetic operation on the basis of the pixel-density conversion ratio data from the selection means, and converting the pixel-density of the image data to the predetermined pixel-density.

The pixel-density converting means comprises conversion-pixel position-detecting means for detecting the conversion-pixel position, on the basis of the pixel-density conversion ratio data selected by the selection means, in synchronism with the transmission of each pixel of the image data, and for outputting conversion-pixel position data; reference-pixel extracting means for extracting a reference pixel from the image data, and outputting reference pixel data; conversion-pixel density operating means for receiving the position data output from the conversion-pixel position-detecting means and the reference-pixel data output from the reference-pixel extracting means, calculating the density of the conversion-pixel, on the basis of the input data, and outputting a calculated result as a conversion-pixel density value; and binary-encoding means for receiving the conversion-pixel density value output from the conversion-pixel density operating means, and binary-encoding this value.

The pixel-density converting means includes threshold value-setting means for receiving the reference pixel data output from the reference-pixel extracting means, and setting a threshold value, on the basis of the reference pixel data. The binary-encoding means binary-encodes the conversion-pixel density value generated by the conversion-pixel density operating means, on the basis of the threshold value set by the threshold value-setting means.

In another embodiment, the input means is connected to a plurality of image data-output devices for outputting image data items having different pixel densities, and selectively receives image data from one of this plurality of image data-output devices.

The image-resolution conversion apparatus of the present invention further comprises discriminating means for discriminating which one of the plurality of image data-output devices has output the image data. The selection means selects the pixel-density conversion ratio data according to the discrimination result output by the discriminating means.

BRIEF DESCRIPTION OF THE DRAWINGS

FIG. 7 is a block diagram showing an arrangement of a pixel-density converter in the image-resolution conversion apparatus shown in FIG. 5;

FIGS. 8 and 9 are views for explaining the principle of operation of a conversion-pixel position detector in the pixel-density converter shown in FIG. 7;

FIGS. 12A and 12B are views for explaining the operation of the original-pixel extractor shown in FIG. 11;

FIG. 16 is a block diagram of a pattern detector;

FIGS. 17 to 21 are views for explaining the operation of the pattern detector;

FIG. 22 is a table showing threshold values set by a threshold value selector in the pixel-density converter shown in FIG. 7;

FIGS. 25 and 26 are circuit diagrams showing modifications of the threshold value setter.

DETAILED DESCRIPTION OF THE PREFERRED EMBODIMENTS

Figure 1:
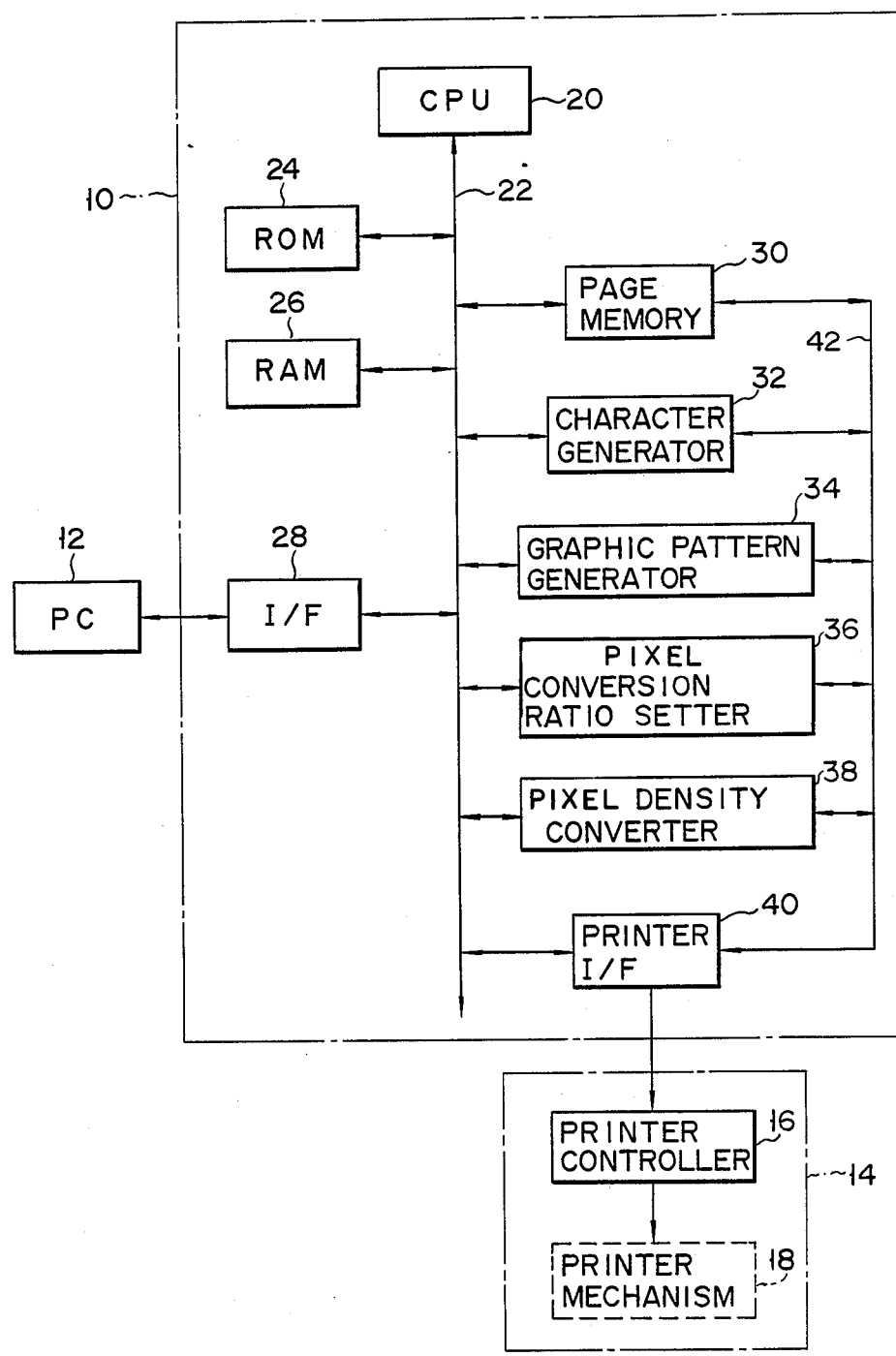
FIG. 1 is a block diagram showing a configuration of a printer system including an image-resolution conversion apparatus according to an embodiment of the present invention.

FIG. 1 is a block diagram showing a printer system including image-resolution conversion apparatus 10 according to an embodiment of the present invention. Conversion apparatus 10 converts the resolution of image data output from an image data-output device (e.g., personal computer (PC) 12) into a resolution which matches that of printer 14. Personal computer 12 outputs predetermined image data in a predetermined format, regardless of the type of printer 14 connected thereto. Printer 14 comprises printer controller 16 and printer mechanism 18. Controller 16 causes mechanism 18 to allow printing on the basis of image data supplied from conversion apparatus 10.

Figures 2, 6:
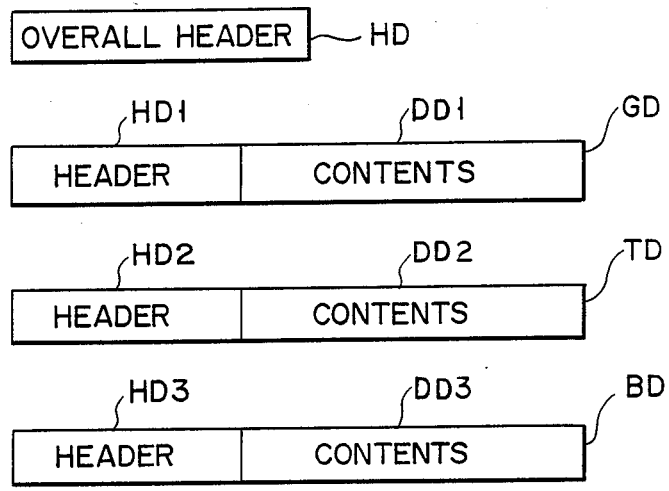
FIG. 2 is a view showing a format of input image data.
FIG. 6 is a view showing a data storage structure of a terminal pixel-density discriminator in the image-resolution conversion apparatus shown in FIG. 5.

FIG. 2 shows a format of image data output from personal computer 12. Reference symbol HD denotes an overall header of image data; GD, graphic data; TD, text data such as character data; and BD, bit image data. Data GD comprises header HD1 and image data DD1 corresponding to information represented by header HD1. Similarly, data TD comprises header HD2 and image data DD2 corresponding to information represented by header HD2, and data BD comprises header HD2 and image data DD3 corresponding to information represented by header HD3. Headers HD1, HD2, and HD3 comprise information such as data length and its position on printing paper. Image data DD3, in bit image data BD, has a resolution of 200 dots/inch in this embodiment.

CPU 20 constituting, for example, a microcomputer, in image-resolution conversion apparatus 10 shown in FIG. 1, controls the overall operations of conversion apparatus 10. System bus 22 is connected to CPU 20. ROM 24 and RAM 26 are connected to system bus 22. Programs required for the operation of CPU 20 are stored in ROM 24 and RAM 26. Personal computer 12 is connected to bus 22 via interface (I/F) 28. Bus 22 is also connected to page memory 30, character generator 32, graphic pattern generator 34, pixel-density conversion ratio setter 36, pixel-density converter 38, and printer interface 40. Memory 30, generators 32 and 34, setter 36, converter 38, and I/F 40 are also connected to image bus 42.

Page memory 30 stores converted outputs from pixel density converter 38 described below. Memory 30 has a memory capacity of 8 MB. Character generator 32 generates a font having a 24-bit height, on the basis of image data from personal computer 12. Graphic pattern generator 34 generates a predetermined graphic pattern, on the basis of the image data received from computer 12.

Pixel-density conversion ratio setter 36 sets a conversion ratio (b/a) of the resolution (b) of printer 14 to the resolution (a) of personal computer 12. Setter 36 comprises, for example, a switch (not shown) and a memory (not shown). The memory stores a plurality of conversion ratios. When the switch is operated, an appropriate conversion ratio (b/a) is output, on the basis of the operation state of the switch. Converter 38 converts the image data received from personal computer 12 into an image having the same resolution as that of printer 14, on the basis of the conversion ratio set by setter 36. The detailed operation of converter 38 will be described later.

Printer I/F 40 sends pixel-density converted data from page memory 30 to printer 14, via image bus 42.

In image-resolution conversion apparatus 10 having the arrangement described above, when image data is output from personal computer 12, CPU 20 discriminates the header of the image data. If the input image data is text data TD, character generator 32 is operated to convert the text data into bit image data. Then, pixel-density converter 38 is operated on the basis of the conversion ratio set by pixel-density conversion ratio setter 36. The pixel density of the converted bit image data is converted into that matching the resolution of printer 14. The converted bit image data is supplied to page memory 30 via image bus 42, and is stored therein.

If the input image data is graphic data GD, graphic pattern generator 34 is operated according to the conversion ratio set by pixel-density conversion ratio setter 36. Graphic image data having a resolution matching that of printer 14 is generated. The generated graphic data is stored in page memory 30.

If the input image data is bit image data BD, pixel-density converter 38 is operated on the basis of the conversion ratio set by pixel-density conversion ratio setter 36. The pixel density of the bit image data is converted into that matching the resolution of printer 14. The converted image data is stored in page memory 30.

As is apparent from the above description, the image data is converted such that its resolution matches the resolution of printer 14, and is continuously read out from page memory 30. The readout data is sent to printer 14 via image bus 42 and printer I/F 40. Therefore, printer 14 receiving the converted data can print an image the same size as that of the original image supplied by personal computer 12. At the same time, the resolution of the output image from printer 14 is connected to match that of printer 14.

According to the embodiment described above, the resolution of the image data output from personal computer 12 can be converted, by image-resolution conversion apparatus 10, to match the resolution of printer 14. Regardless of the resolution of the image data-output device, such as personal computer 12, the output image from the printer has the same size as that output from the image data-output device. Individual printers corresponding to the resolution of the respective image data-output devices are not required, unlike in the conventional arrangement, thus reducing the total cost.

When the pixel density of the image data-output device is lower than that of printer 14, low-cost, high-speed processing can be performed by using a smaller number of bits. In addition, the image formed by printer 14 has a high resolution. As a result, a high-quality image can be obtained.

Figure 3:
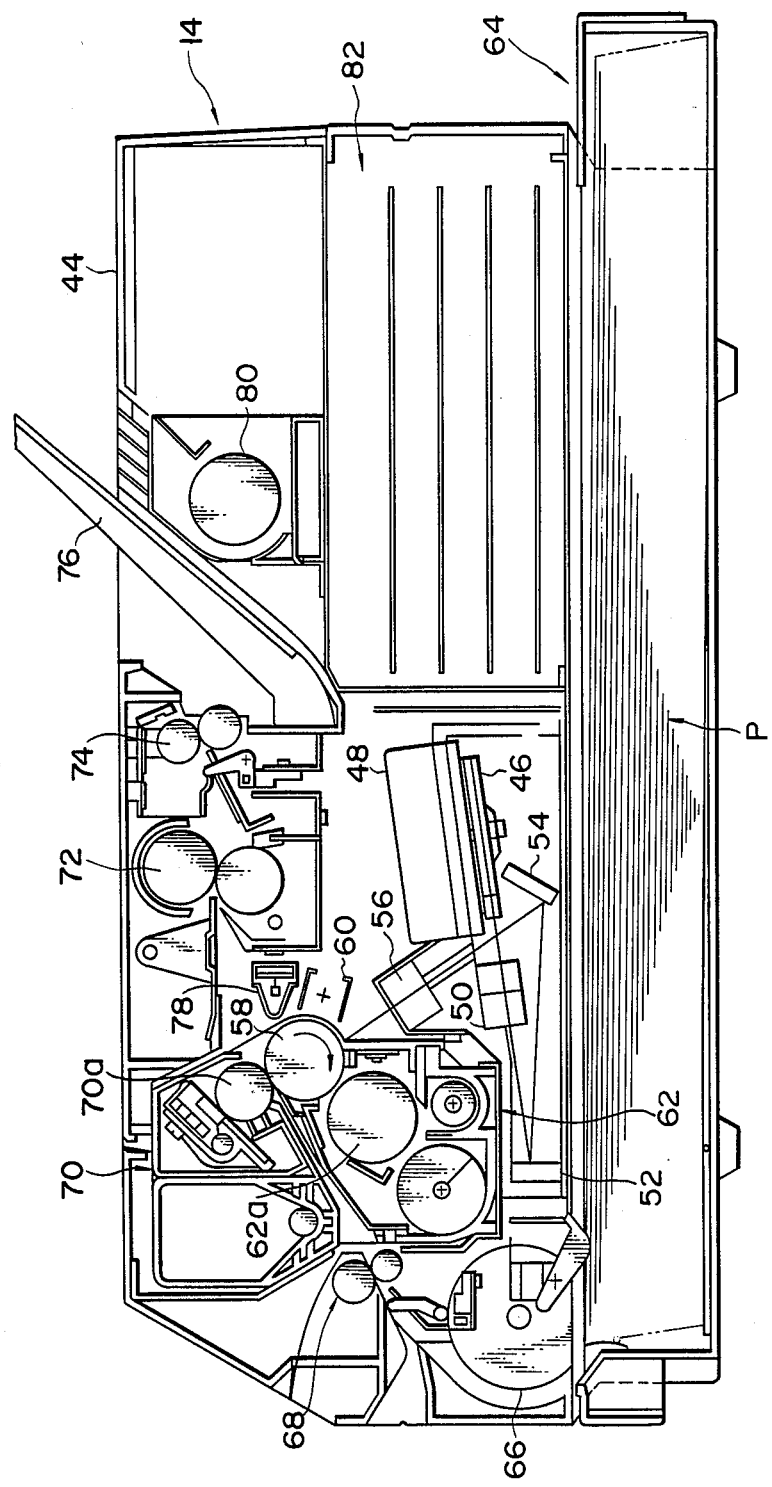
FIG. 3 is a side sectional view showing an arrangement of a printer apparatus to be used in the present invention.

FIG. 3 is a view showing a laser printer as an example of printer 14. Printer 14 uses a semiconductor laser and has a resolution of 400 dots/inch in both the main scanning and subscanning directions.

Referring to FIG. 3, polygonal mirror 46 is arranged in printer housing 44, so as to oscillate the laser beam pulses from a semiconductor laser (not shown) in the main scanning direction. Mirror 46 is rotated by motor 48. A laser beam reflected by mirror 46 is incident on photosensitive drum 58 via first f-$\theta$ lens 50, mirrors 52 and 54, and second f-$\theta$ lens 56. Drum 58 is designed to rotate in the direction indicated by arrow A, and the surface of drum 58 is electrically charged by charger 60. Thereafter, when the laser beam is incident on the surface of drum 58, the irradiated portion of drum 58 is discharged to form a latent image. The latent image is visualized by developing unit 62. Unit 62 stores a toner charged at the same polarity as that of the surface of drum 58. The toner particles are attached to the surface of drum 58 by developing roller 62a, thereby producing a toner image.

Paper cassette 64 is detachably arranged at the bottom of printer housing 44. Paper sheets P, stored in cassette 44, are picked up one by one by paper-feed roller 66 driven in synchronism with the rotation of drum 58. The leading edge of sheet P is aligned by alignment roller pair 68, and sheet P is then fed to transfer unit 70. In unit 70, the toner image is transferred to sheet P fed by transfer roller 70a charged at a polarity opposite to that of the surface of drum 58. Sheet P having the toner image thereon is fed to fixing roller pair (heat roller) 72, and passes between the heat roller and press roller of pair 72. The toner image is thus fixed on the surface of sheet P. Sheet P is then ejected, by ejection roller pair 74, onto paper tray 76 arranged at the upper surface portion of housing 44.

After image transfer, photosensitive drum 58 is discharged by discharge lamp 78, so as to remove the after-image, and restores the initial condition. Reference numeral 80 denotes a cooling fan for cooling the interior of printer housing 44; and 82, a circuit housing, for accommodating printer controller 16 for controlling the components of printer 14 and flashing a semiconductor laser (not shown), on the basis of image data supplied from an external device.

Figure 4:
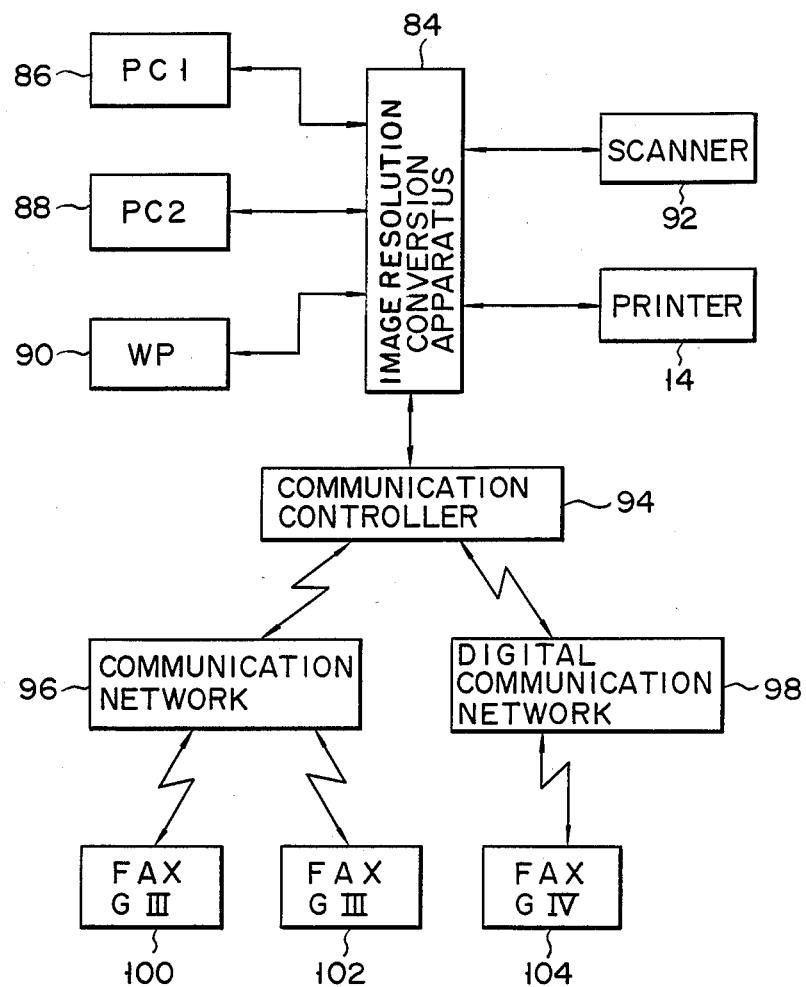
FIG. 4 is a block diagram of a printer system including an image-resolution conversion apparatus according to another embodiment of the present invention.
Figure 5:
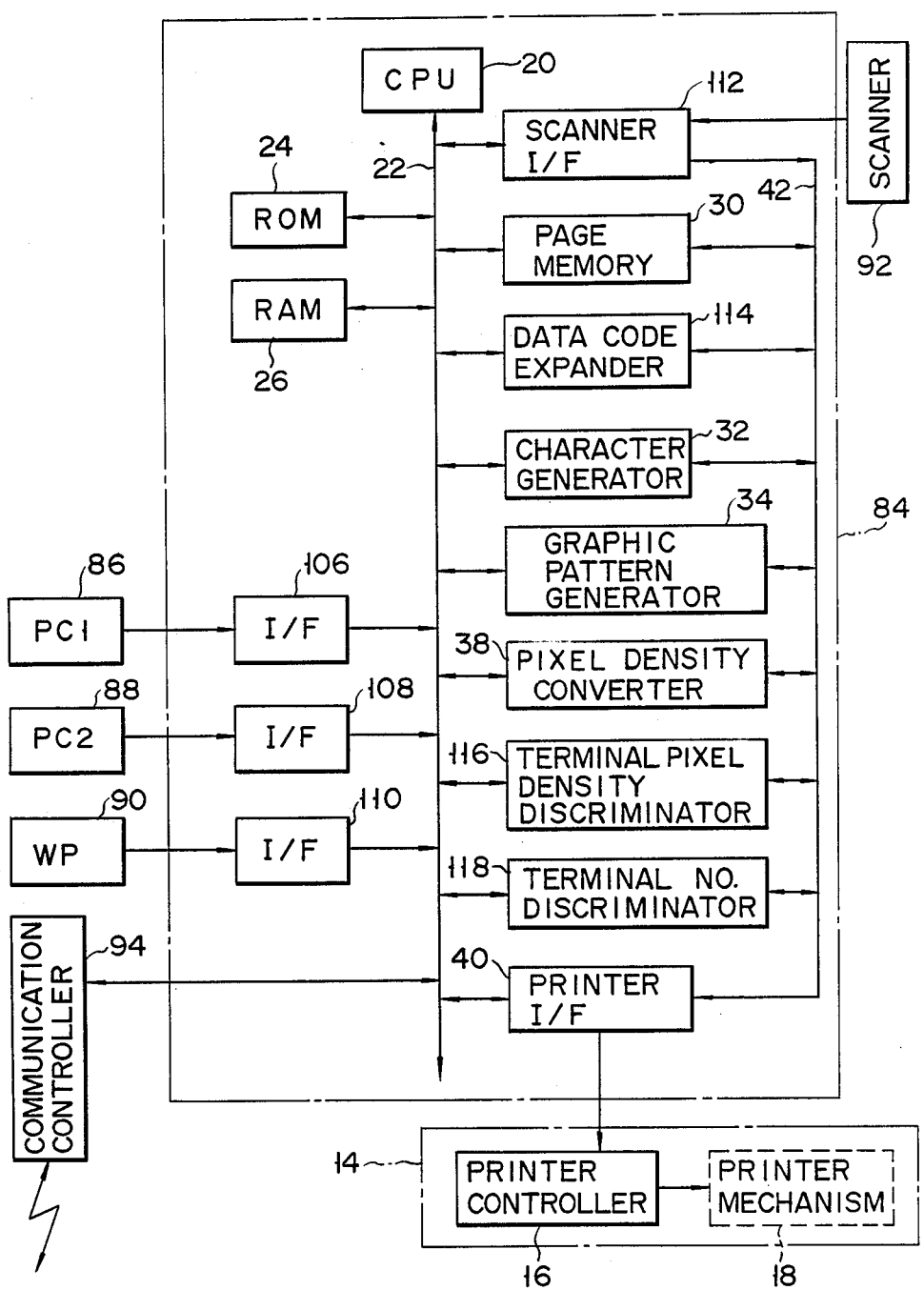
FIG. 5 is a block diagram showing a detailed arrangement of the image-resolution conversion apparatus used in the system of FIG. 4.

Another embodiment of the present invention will now be described below. FIGS. 4 and 5 show the arrangement of the second embodiment. The same reference numerals as in FIG. 1 denote the same parts in FIGS. 4 and 5, and thus a detailed description thereof will be omitted.

FIG. 4 schematically shows the arrangement of a printer system capable of printing image data received from various image data-output devices. Image-resolution conversion apparatus 84 is connected to first and second personal computers (PC1) 86 and (PC2) 88, wordprocessor (WP) 90, scanner 92 for reading image data and outputting an electrical signal corresponding thereto, and communication controller 94. Controller 94 allows communications according to G III and G IV facsimile protocols. G III facsimile systems 100 and 102 are connected to controller 94 via communication network 96. G IV facsimile system is connected to controller 94 via digital communication network 98.

The resolution of each of the above devices is as follows:

Personal Computers 86 and 88: 200 dots/inch in both main scanning and subscanning directions Wordprocessor 90: 300 dots/inch in both main scanning and subscanning directions Scanner 92: 400 dots/inch in both main scanning and subscanning directions Printer 14: 400 dots/inch in both main scanning and subscanning directions Facsimile Systems 100 and 102: 8 lines/mm in the main scanning direction and 7.7 or 3.85 lines/mm in the subscanning direction Facsimile System 104: 200, 240, 300, or 400 dots/inch in both main scanning and subscanning directions FIG. 5 shows a detailed arrangement of image-resolution conversion apparatus 84. In conversion apparatus 84, CPU 20 is connected to system bus 22. Bus 22 is also connected to ROM 24, RAM 26, and communication controller 94. Personal computers 86 and 88 and wordprocessor 90 are connected to system bus 22 via corresponding interfaces 106, 108, and 110. Scanner interface (I/F) 112, page memory 30, data code expander 114, character generator 32, graphic pattern generator 34, pixel-density converter 38, terminal-pixel density discriminator 116, terminal number discriminator 118, and printer interface (I/F) 40 are connected between system bus 22 and image bus 42.

Data code expander 114 expands the compressed image data sent from, for instance, facsimile systems 100, 102, and 104. Terminal number discriminator 118 determines that the terminal currently outputting image data is personal computer 86 or 88, wordprocessor 90, facsimile system 100, 102, or 104 connected via communication controller 94, or scanner 92. Terminal-pixel density discriminator 116 determines the pixel density of the image data output from the terminal discriminated by discriminator 118. Pixel-density discriminator 116 comprises a ROM for storing predetermined pixel-density conversion ratios corresponding to the terminal numbers, as is shown in FIG. 6. When terminal number data is output from discriminator 118 to discriminator 116, discriminator 116 outputs a pixel-density conversion ratio corresponding to the terminal number represented by the data output from discriminator 118.

The operation of the printer system having the above arrangement will now be described below.

For example, when image data is input from personal computer 86 or 88, wordprocessor 90, scanner 92, or facsimile system 100, 102, or 104 to image-resolution conversion apparatus 84, terminal number discriminator 118 determines which one of the terminals has supplied the image data to conversion apparatus 84. A discrimination result is supplied to terminal-pixel density discriminator 116.

If terminal number discriminator 118 determines that image data is being output from personal computer 86 or 88 to image-resolution conversion apparatus 84, CPU 20 discriminates the header of the image data. If the input image data is text data TD, character generator 32 is operated as described above. The input text data is converted into 24×24 bits image data. Thereafter, pixel-density converter 38 is operated to convert the pixel-density of the converted bit image data into a line density matching the resolution of printer 14, according to the pixel-density conversion ratio determined by terminal pixel density discriminator 116. The converted image data is stored in page memory 30. However, if the input image data is graphic data GD, graphic pattern generator 34 is operated to generate graphic image data, having a size corresponding to the resolution of printer 14, according to the conversion ratio set by discriminator 116. The generated image data is stored in page memory 30. If the input image data is bit image data BD, pixel-density converter 38 is operated to convert the pixel density of the input into a pixel density matching the resolution of printer 14, according to the pixel-density conversion ratio determined by discriminator 116. The converted image data is stored in page memory 30.

The converted image data, matching the resolution of printer 14, is continuously read out from page memory 30, and is supplied to printer 14 via image bus 42 and printer interface 40. When printer 14 receives the image data, a high-resolution image matching the resolution of printer 14 is produced, being the same size as that of the original image output from personal computer 86 or 88. It should be noted that the image data output from wordprocessor 90 can be converted in the same manner as described above.

The image data input from scanner 92 is stored in page memory 30 via scanner I/F 112. Since the resolution of scanner 92 matches that of printer 14, the image data stored in page memory 30 is supplied, unmodified, to printer 14 via printer I/F 40, and is printed by printer 14.

Image data input from facsimile system 100, 102, or 104, via communication controller 94, is expanded by data code expander 114. The expanded image data is supplied to pixel-density converter 38, and is converted thereby according to the pixel-density conversion ratio set by terminal-pixel density discriminator 116. In this case, pixel-density conversion according to the different pixel-density conversion ratios obtained for the main scanning and subscanning directions, is performed for the G·III mode image data output from system 100 or 102. The converted image data is stored in page memory 30. The image data stored in page memory 30 is output to printer 14 via printer I/F 40.

According to the embodiment described above, pixel-density conversion of input image data, along both the main scanning and subscanning directions, is performed by pixel-density converter 38. Therefore, the image data output from the facsimile system can be properly printed.

Terminal number discriminator 118 determines the number of the terminal currently generating image data. A pixel-density conversion ratio is set by terminal-pixel density discriminator 116, and conversion is performed by pixel-density converter 38. Therefore, a plurality of image data-output devices having different resolutions can be connected to one printer 14. Moreover, the image data output from the image data-output device can be automatically converted to data having a pixel density corresponding to that of printer 14. Therefore, in practice, the image-resolution conversion apparatus of this embodiment is convenient to use.

Since a plurality of image output devices can be connected to printer 14 which is not used continuously by one image output device, the total cost of the system can thus be reduced. If the pixel-density of the image data-output device is lower than that of printer 14, low-cost, high-speed processing can be achieved using a smaller number of bits. In this case, the image printed by printer 14 has high resolution, and thus, a high-quality image can be reproduced.

Pixel-density converter 38 will now be described in detail, with reference to the accompanying drawings.

FIG. 7 shows an arrangement of converter 38. Converter 38 includes conversion-pixel position detector 120 for detecting the position of a converted pixel, with respect to the original image, original-pixel extractor 122 for extracting a reference original pixel, conversion-pixel density operation circuit 124 for calculating the density of a conversion pixel, a threshold-value setter 126 for dynamically setting a threshold-value, a binary-encoding circuit 128 for digitizing the conversion-image density, input I/F 130 for inputting image data, output I/F 132 for outputting image data, and control circuit 134 for controlling I/O operations and conversion. Converter 38 also includes image bus 42 for transmitting image data, system bus 22 for exchanging control commands and execution parameters with an external CPU 20, and a control bus (not shown) for connecting control circuit 134 to other circuits.

Original-pixel extractor 122 comprises line buffer 122a having a maximum number of reference lines, so as to allow easy selection of the reference pixel, and pixel extractor 122b for accessing line buffer 122a. Threshold-value setter 126 comprises original-pixel density analyzer 126a and threshold-value selector 126b.

The detailed arrangement of the main part of pixel-density converter 38 will now be described below. Conversion-pixel position detector 120 will be described first.

FIGS. 8 and 9 show positional relationships between original pixels (o) and conversion pixels (x) in the image-enlargement and -reduction modes, respectively. The positions of the conversion pixels are sampling positions at the time of conversion.

If the distance between the original pixels is normalized to be 1, conversion ratio r is defined as follows:

$$r = 1/s \qquad (1)$$

where s is the distance between the conversion pixels.

The sampling position of the jth conversion pixel is a position with a small displacement given by:

$$t = s*j - 1 \text{ for } 0 < t < 1 \quad (2)$$

from a position where the ith original pixel is fetched so as to satisfy:

$$i = [s*j] \quad (3)$$

where [ ] is the Gaussian symbol.

Figure 10:
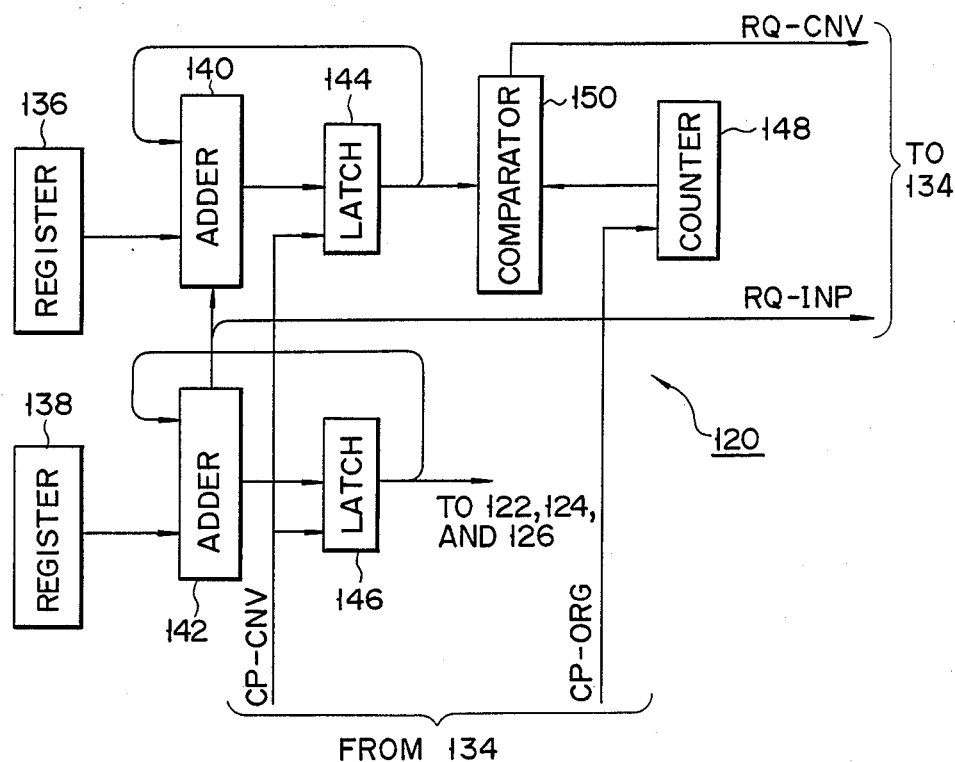
FIG. 10 is a circuit diagram of the conversion-pixel position detector in the pixel-density converter shown in FIG. 7.

Conversion-pixel position detector 120 may comprise a counter for counting the coordinate position of an original pixel, in synchronism with the transfer of the original pixel, an operation unit for updating the position of the conversion pixel, and a comparator for comparing the output from the counter with the output from the operation unit. More specifically, as is shown in FIG. 10, detector 120 comprises an x-coordinate circuit including registers 136 and 138, adders 140 and 142, latches 144 and 146, counter 148, and comparator 150, and a y-coordinate circuit having the same arrangement as the x-coordinate circuit.

Register 136 stores sampling distance s of the conversion image, i.e., an integral part of the pixel-density conversion ratio. Register 138 stores a decimal fraction of the conversion ratio. Adders 140 and 142 update the sampling position o the conversion image. Latches 144 and 146 store conversion-image pixel positions, and the positions are updated in response to clock CP-CNV supplied from control circuit 134. Counter 148 stores the coordinates of the original image, and is counted up in response to clock CP-ORG supplied from control circuit 134. Comparator 150 compares the conversion pixel stored in latch 144 with the original pixel counted by counter 148. If the conversion pixel coincides with the original pixel, comparator 150 supplies conversion operation-request signal RQ-CNV to control circuit 134. At the time of initialization, latches 144 and 146 and counter 148 are cleared.

The operation of the conversion pixel position detector 120 will now be described below.

In the reduction mode, since latches 144 and 146 are set at "0" at the beginning, conversion operation-request signal RQ-CNV is output to control circuit 134, and conversion is then performed. At this time, clock CP-CNV is input from control circuit 134, in response to signal RQ-CNV, and the next conversion-pixel position is stored in latches 144 and 146. Every time an original pixel is input, the count of counter 148 is updated. When the value of latch 144 coincides with the count of counter 148, signal RQ-CNV is generated. In this case, slight displacement t in equation (2) is stored in latch 146.

In the enlargement mode, pixels between original pixels are interpolated, and thus, conversion operation-request signal RQ-CNV is always output. When the conversion-pixel position exceeds the original-pixel position while the data in latches 144 and 146 are updated, i.e., when a carry-signal generated by adder 142 is used as original-pixel fetching-request signal RQ-INP, position-detection cycles are sequentially performed. It should be noted that the coordinate signals of the conversion and original pixels are cleared whenever detection reaches the end of a line.

Original-pixel extractor 122 will now be briefly described.

Figure 11:
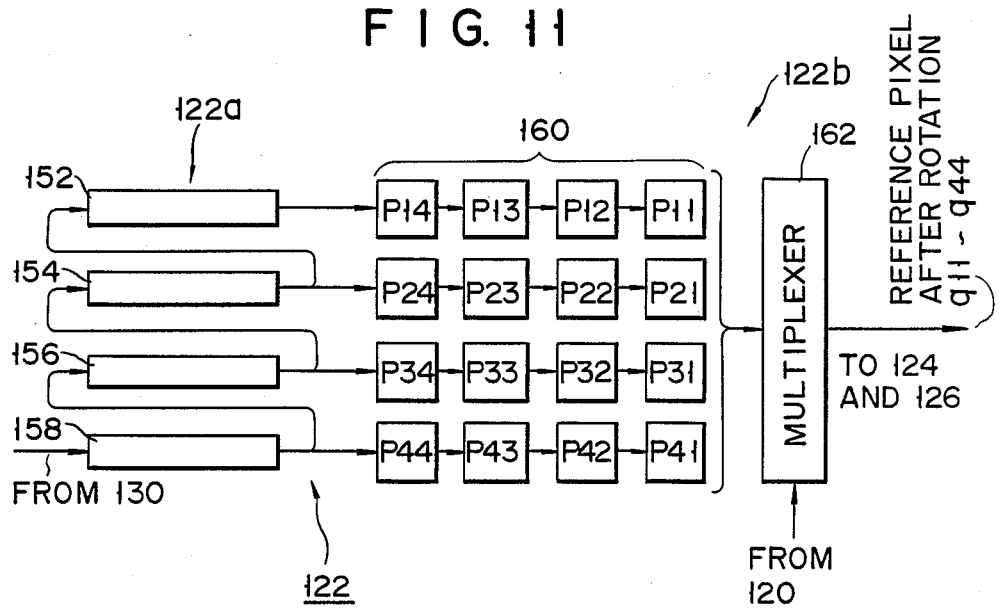
FIG. 11 is a block diagram of an original-pixel extractor in the pixel-density converter shown in FIG. 7.

FIG. 11 shows an arrangement of extractor 122. Extractor 122 comprises four line buffers 152 to 158, register 160 for storing some (4×4) of the reference original pixels stored in buffers 152 to 158, and multiplexer 162 for rotating the reference original pixels. In extractor 122, original pixels of lines are sequentially stored and shifted in line buffers 152 to 158. At the same time, four pixels of each line are extracted and stored in register 160. When extractor 122 receives conversion operation-request signal RQ-CNV from conversion-pixel position detector 120, extractor 122 causes multiplexer 162 to perform rotation processing of 4×4 pixels $p_{11}$ to $p_{44}$. The rotated pixels are output as reference original pixels $q_{11}$ to $q_{44}$.

The rotation operation of original-pixel extractor 122 will now be described below.

In this embodiment, a theoretical conversion expression is used as a smoothing function having a positive weighting distribution. In this case, as is shown in FIGS. 12A and 12B, conversion pixel $Q_1$ has a specific position and density distribution, as does conversion pixel $Q_2$. A density operation value of pixel $Q_1$ is the same as that of pixel $Q_2$. Therefore, in order to eliminate operation redundancy, in this embodiment, an area defined by four pixels is divided into four regions, as is shown in FIGS. 12A and 12B. Rotation of the reference original pixels is performed according to which one of the regions includes the conversion-pixel position, so that all conversion-pixel positions are concentrated in the second quadrant. The divided region which includes all conversion-pixel positions can be detected by the slight displacement output from conversion-pixel position detector 120.

Figure 13:
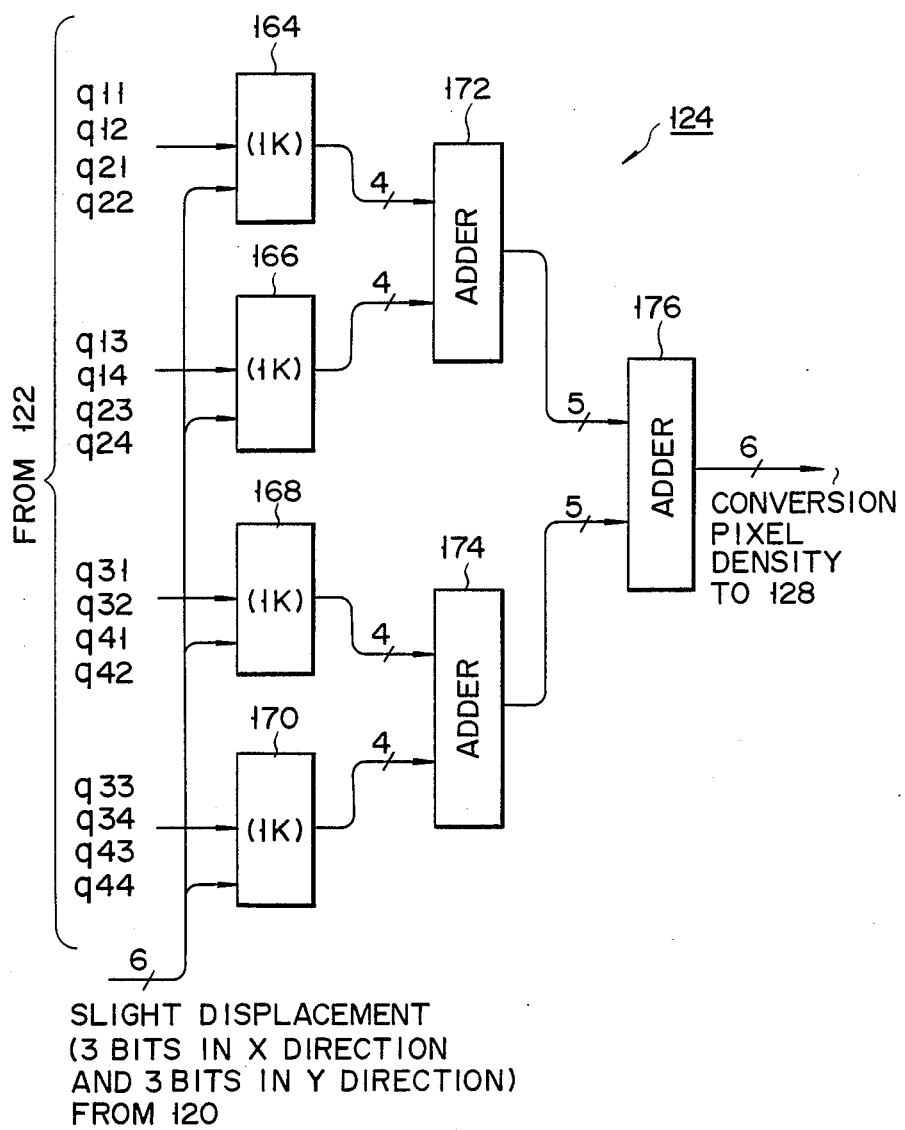
FIG. 13 is a block diagram of a conversion-pixel density operation circuit of the pixel-density converter shown in FIG. 7.

As is shown in FIG. 13, conversion-pixel density operation circuit 124 comprises four ROMs 164 to 170 for storing calculated results for all density distributions, in units of 2×2 pixels, and adders 172 to 176 for adding the outputs from ROMs 164 to 170. By switching ROMs 164 to 170, one of the several algorithms stored therein can be selected. Operation circuit 124 receives reference original-pixel data signals $q_{11}$ to $q_{44}$ output from original-pixel extractor 122, and the slight pixel-displacement output from pixel-position detector 120, and causes adders 172 to 176 to sequentially add the coincided density values of ROMs 164 to 170, in units of 2×2 pixels. The sums are then supplied to binary circuit 128.

Original-pixel density analyzer 126a will now be described below.

Figure 14:
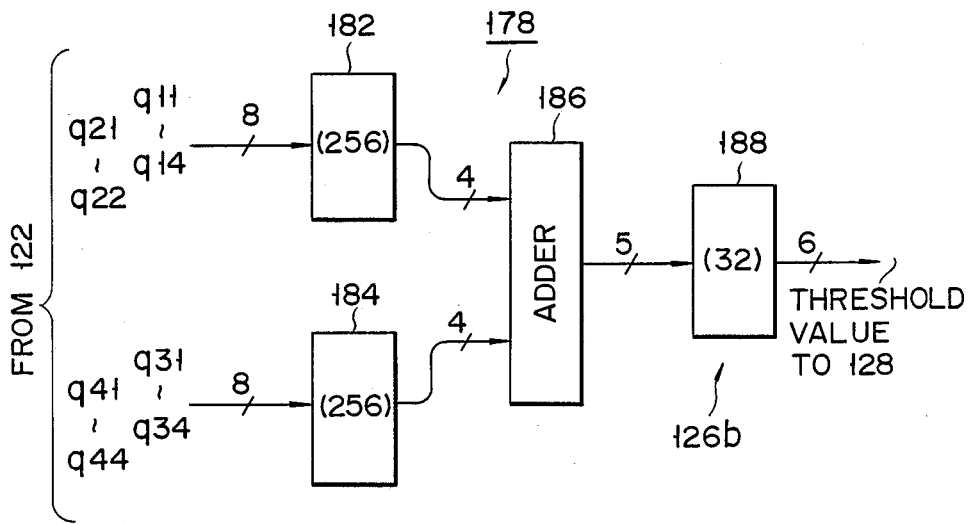
FIG. 14 is a block diagram of an average-density operation circuit.

Analyzer 126a primarily includes average-density operation circuit 178 which operates in the reduction mode, and pattern detector 180 which operates in the enlargement mode. As is shown in FIG. 14, average-density operation circuit 178 comprises ROMs 182 and 184 for converting an area of 4×2 into a predetermined calculated density value, and adder 186 for adding these density values. Operation circuit 178 is connected to ROM 188 arranged in threshold-value selector 126b and storing the threshold values corresponding to sums output from adder 186.

A technique for setting a threshold value by means of average-density operation circuit 178 will now be described.

Figure 15A:
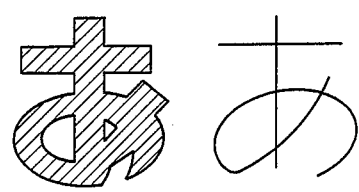
FIGS. 15A and 15B are views for explaining the method of setting a threshold value in the average-density operation circuit.
Figure 15B:
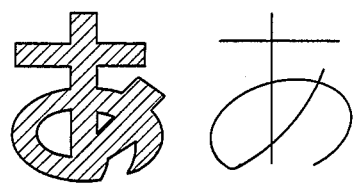

When an operation result is digitized into binary data, in a conventional arrangement, the user must reset the threshold value by visually observing the output image, regardless of the constant or variable value. Moreover, the threshold value cannot be locally changed according to the local characteristics of the image. According to this technique, a graphic constituted by a thick line can be output with good reproducibility, as is shown in FIG. 15A. However, when a threshold value is set for reduction, a thin line constituting a graphic is made thinner and is partially omitted. However, when the threshold value is set on the basis of the thin line, the graphic of a thick line blurs, as is shown in FIG. 15B.

In the above embodiment, however, an average density is calculated on the basis of the reference pixel data, when the densities of these graphics, in unit area, differ greatly from each other. The threshold value is then corrected on the basis of the average density, thereby eliminating the problems posed by the technique using the predetermined threshold value.

Pattern detector 180 comprises specific detection ROM 190, as is shown in FIG. 16, ROM 190 being connected to threshold-value selection ROM 192 in threshold-value selector 126b.

A technique for setting a threshold value by means of pattern detector 180 will now be described below.

When, in the enlargement mode, the threshold value is simply replaced by the conversion-pixel density value of an original pixel nearby, the image quality is greatly degraded, as has previously been described. In particular, a zig-zag pattern appears at the diagonal portion, as is shown in FIG. 17, and the readability of the image is consequently very poor. This problem can be solved to some extent, wherein the adjacent original pixels are referred to smooth the density, and the smoothed result is digitized into binary data with a predetermined threshold value. However, if this method is applied to a diagonal pattern consisting of continuous dots, the having the diagonal line is lost. In the positional relationship shown in FIG. 18, a smoothing function of the conversion pixel Q is set as follows:

$$D_Q = (1-u)(1-v)D_{P_{IJ}} + u(1-v)D_{P_{IJ+1}} + (1-u)vD_{P_{I+1J}} + uvD_{P_{I+1J+1}} \quad (4)$$

(for $0 \leq u$ and $v \leq 1$)

where $D_Q$ is the density value of pixel Q, and 0 of $D_O$ is $P_{IJ}$, $P_{IJ+1}$, $P_{I+1J}$, and $P_{I+1J+1}$.

Figure 19A:
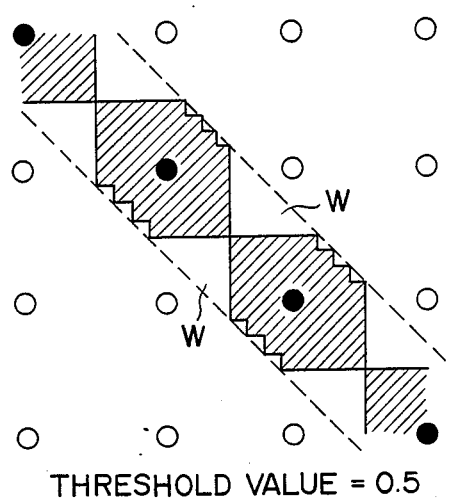
Figure 19B:
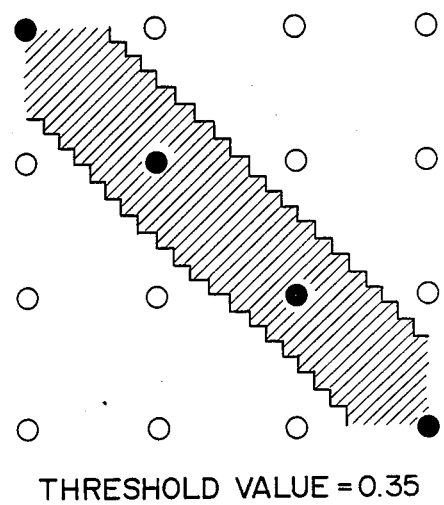
Figure 20A:
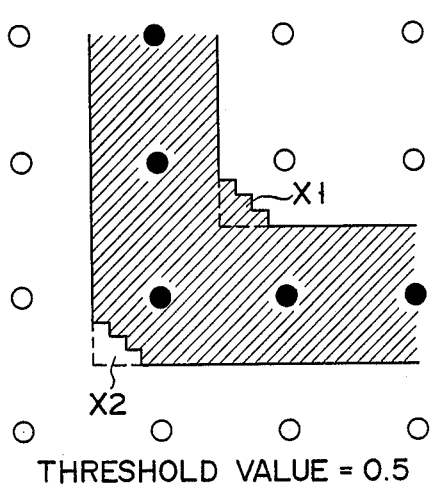
Figure 20B:
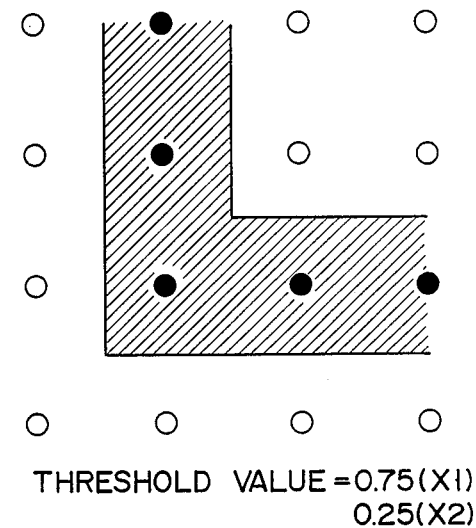

If the result is digitized with a threshold value of 0.5, a black diagonal line appears as is shown in FIG. 19A, because the white region pixels greatly influence the density of the conversion pixels. In this case, if the threshold value is lowered, continuity is maintained, as is shown in FIG. 19B. However, if other portions are digitized with this low threshold value, the image quality is greatly degraded. For example, a white diagonal line disappears in the black background. A cross-shaped portion and a L-shaped portion are preferably processed while their shapes are maintained. However, as was described above, the shapes of these portions are deformed, as is shown in FIG. 20A. Assume that the smoothing function is given by equation (4). Accordingly, if the threshold value is increased to 0.75 for the $X_1$ portion and is decreased to 0.25 for the $X_2$ portion, the original shape is maintained, as is shown in FIG. 20B.

Every time a specific pattern is detected, the threshold value is dynamically changed to increase the size of the original image, without changing its shape.

When a specific pattern is detected within a 4×4 pixel area, the detection conditions are complicated due to the coexistance of diagonal lines and L-shaped portions. However, since rotation processing of the reference original-image data is performed by original-pixel extractor 122, the conversion-pixel density values are calculated in only the second quadrant, as a quarter of the area of the four original pixels. The threshold values must be changed for the conversion pixels in areas W (FIG. 19A) and X (FIG. 20A). The direction can be neglected for reference pixels $q_{11}$ to $q_{44}$ after rotation.

The pattern-detection conditions for reference pixels $q_{11}$ to $q_{44}$ are given as follows, with reference to FIG. 21.

(A) Black Diagonal Line Detection $q_{22}=0$, $q_{23}=1$, $q_{32}=1$, $q_{33}=0$, ($q_{13}=0$ or $q_{24}=0$), and ($q_{31}=0$ or $q_{42}=0$)

(wherein 0 is a white pixel and 1 is a black pixel)

(B) White Diagonal Line Detection $q_{22}=1$, $q_{23}=0$, $q_{32}=0$, $q_{33}=1$, and ($q_{13}=1$ or $q_{24}=1$), and ($q_{31}=1$ or $q_{42}=1$)

(C) Black L-Shape Detection $q_{22}=0$, $q_{23}=1$, $q_{32}=1$, $q_{33}=1$, and ($q_{13}=1$ or $q_{31}=1$)

(D) White L-Shape Detection $q_{22}=1$, $q_{23}=0$, $q_{32}=0$, $q_{33}=0$, and ($q_{13}=0$ or $q_{31}=0$)

In this embodiment, pattern detection can be achieved by referring to only reference pixels $q_{22}$, $q_{23}$, $q_{32}$, $q_{33}$, $q_{13}$, $q_{24}$, $q_{31}$, and $q_{42}$ after rotation.

Figures 21, 22:
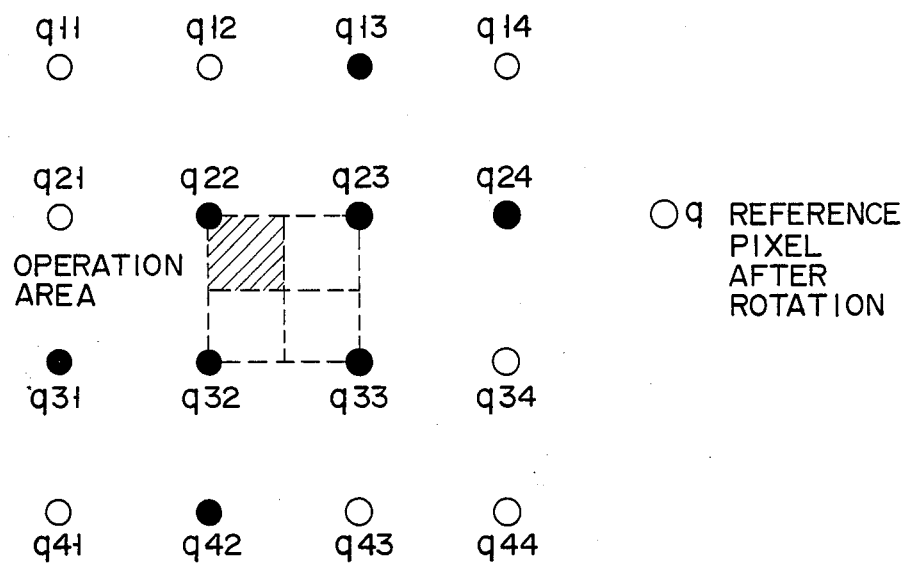

When the black diagonal line is detected, the threshold value set by threshold-value selector 126b, connected to pattern detector 180, is set to 0.3–5, as is shown in FIG. 22. When the white diagonal line is detected, the threshold value is set to 0.65. When the black L-shape is detected, the threshold value is set to 0.75. When the white L-shape is detected, the threshold value is set to 0.25. Otherwise, the threshold value is set to 0.5.

The operation of pixel-density converter 38 having the arrangement as described above will now be described below.

The original image data subjected to pixel-density conversion is fetched by input I/F 130 via image bus 42. The conversion-pixel position is detected by conversion-pixel position detector 120, in synchronism with the transfer of pixels of the original-image data. When the position of the conversion pixel is detected, the reference original-pixel data is extracted by pixel extractor 122b from line buffer 122a, so as to calculate the density of the conversion image and analyze the adjacent density-distribution state. The extracted reference original-pixel data is input to conversion-pixel density operation circuit 124 and original-pixel density analyzer 126a. Operation circuit 124 uses the reference pixel data and conversion-pixel position data output from detector 120, and calculates the density of the conversion pixel. Analyzer 126a calculates the average density of the adjacent pixels, or detects a specific pattern. A threshold value is set on the basis of the calculation or detection result. The density value of the conversion value is digitized on the basis of the threshold value. The binary data is then output from output I/F 132 via image bus 42.

Figures 23A, 23B, 23C, 23D:
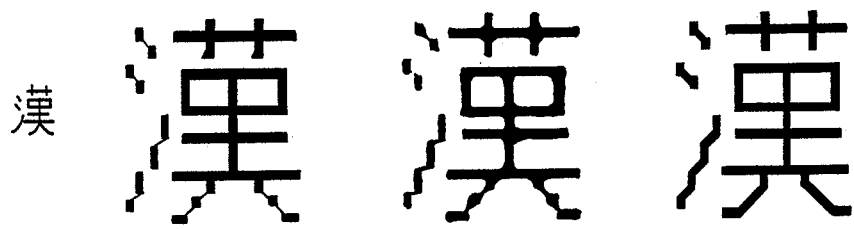
FIGS. 23A to 23D and FIGS. 24A to 24D are views for explaining the operation of the pixel-density converter shown in FIG. 7.
Figures 24A, 24B, 24C, 24D:
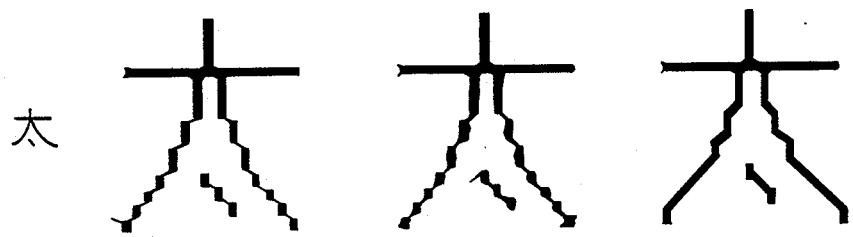

FIGS. 23A to 23D and FIGS. 24A to 24D show examples of enlarged images. FIGS. 23B and 24B show the conversion results obtained by converting original images of FIGS. 23A and 24A by means of a shortest distance approximation method. In this case, zig-zag patterns typically occur in the diagonal portions. FIGS. 23C and 24C show conversion results when a predetermined threshold value is used. The cross- and L-shaped portions are undesirably rounded, and the continuity of the diagonal portions is lost. FIGS. 23D and 24D show conversion results according to this embodiment. The disadvantages of the conventional conversion results are solved by the results shown in FIGS. 23D and 24D.

Figure 25:
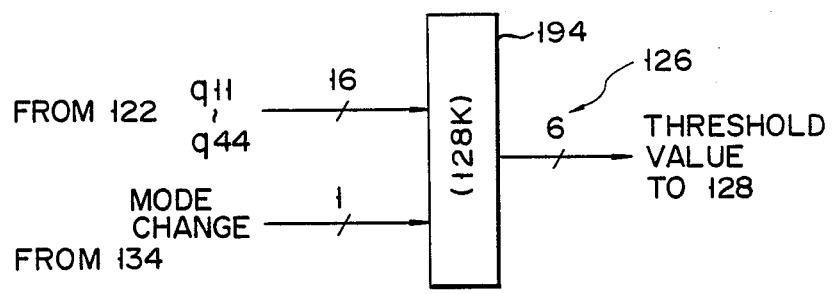

As is shown in FIG. 25, threshold-value setter 126 can comprise large-capacity ROM 194 constituting average-density operation circuit 178, pattern detector 180, and threshold-value selector 126b. In this case, as is shown in FIG. 25, the arrangement can be made simple. The reduction and enlargement conversion modes are switched by control circuit 134.

The average density and the specific pattern are calculated and detected by using the 4×4 pixel area. If this area is enlarged, the calculation or detection precision can be improved. In this case, if the pixel density of the original pixels is high, this effect is conspicuous. However, considering the case of an original image having a low pixel density, the reference range should preferably be variable, so as to achieve high-quality pixel-density conversion.

FIG. 26 shows an arrangement of threshold-value setter 126 having a reference area of 4×4 to 8×8 pixels. Setter 126 comprises total-density operation ROMs 196 to 202 each referring to a 4×4 area, specific pattern detection ROM 204 for receiving the significant 16 pixels selected from the reference pixels, average-density operation adder 206, multiplexer 208 for switching the threshold value, determined by the ambient average density or the specific pattern, threshold-value selection ROM 210, selection control line 212 for causing control circuit 134 to send a signal indicating that the 4×4 area or the 8×8 area is referred, and control line 214 for sending the average density/specific pattern switching signal from control circuit 134. Setter 126 can arbitrarily change the reference area, and includes original-density analyzer 126a and threshold-value selector 126b integrally arranged therein.

The arrangement of pixel-density converter 38 is not limited to the arrangement in the embodiment described above, but can be changed within the spirit and scope of the invention.

Figure 27:
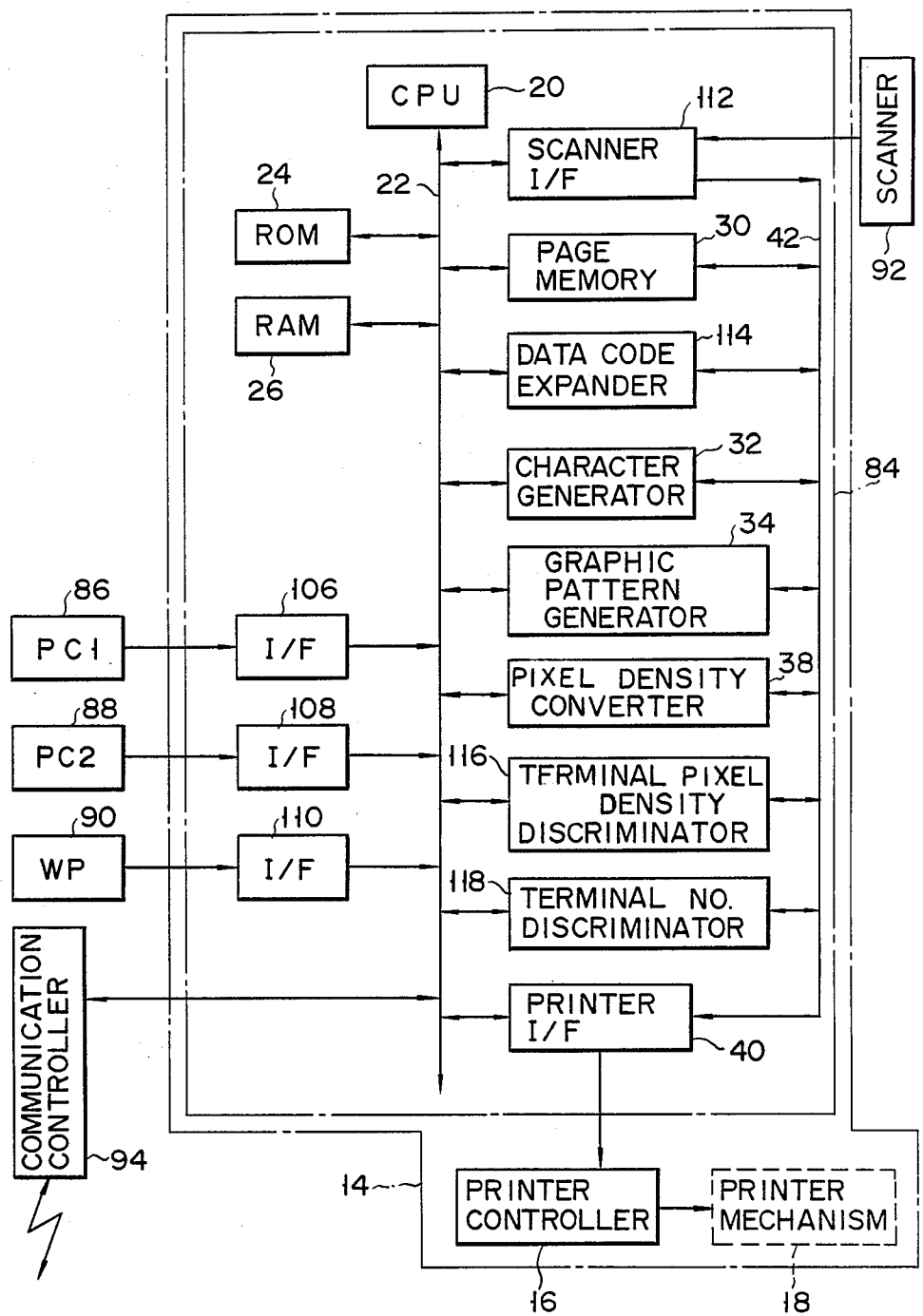
FIG. 27 is a block diagram of a printer system including an image-resolution conversion apparatus according to yet another embodiment of the present invention.

In the above embodiment, image-resolution conversion apparatus 84 is arranged separately from printer 14. However, as is shown in FIG. 27, image-resolution conversion apparatus 84 may be arranged inside printer 14. In this case, conversion apparatus 84 is arranged together with printer controller 16 within circuit housing 82 in printer 14.

Other various changes and modifications may be made within the limit of the spirit and scope of the invention.

What is claimed is:

1. An image-resolution conversion apparatus for converting a pixel-density of an image data, comprising:
    input means for receiving image data which can be of various pixel densities;
    selection means, having a plurality of pixel-density conversion ratio data items, respectively representing ratios of pixel-density conversion for converting the pixel-density of the image data to an other predetermined pixel density stored therein for selecting one of the plurality of stored pixel-density conversion ratio data responsive to the pixel density of the image data received by said input means; and
    pixel-density converting means, receiving the image data received by said input means and the pixel density conversion ratio data corresponding to a ratio between a present pixel density and an input pixel density from said selection means, for performing a predetermined arithmetic operation on the basis of the pixel-density conversion ratio data from said selection means, to convert the pixel density of the image data to said present pixel density.

2. The apparatus according to claim 1, wherein said pixel-density converting means comprises:
    conversion-pixel position-detecting means for detecting the conversion-pixel position, on the basis of the pixel-density conversion ratio data selected by said selection means, in synchronization with transmission of each pixel of the image data, and for outputting conversion-pixel position data;
    reference-pixel extracting means for extracting a reference pixel from the image data, and outputting reference pixel data;
    conversion-pixel density operating means for receiving the position data output from said conversion-pixel position-detecting means and the reference pixel data output from said reference-pixel extracting means, calculating the conversion-pixel density, on the basis of the input data, and outputting a calculated result as a conversion-pixel density value; and
    binary-encoding means for receiving the conversion-pixel density value output from said conversion-pixel density operating means, and binary-encoding the conversion-pixel density value.

3. The apparatus according to claim 2, wherein said pixel-density converting means includes threshold-value setting means for receiving the reference-pixel data output from said reference-pixel extracting means, and setting a threshold value on the basis of the reference-pixel data; and said binary-encoding means binary-encodes the conversion-pixel density value generated by said conversion-pixel density operating means, on the basis of the threshold value set by said threshold-value setting means.

4. The apparatus according to claim 1, wherein said input means is connected to a plurality of image data-output devices for outputting image data items of different pixel densities, and selectively receives image data from one of said plurality of image data-output devices,
    said image-resolution conversion apparatus further comprises discriminating means for determining which one of said plurality of image data-output devices has output the image data; and
    said selection means selects the pixel-density conversion ratio data according to a discrimination result output by said discriminating means.

5. The apparatus according to claim 4, wherein said pixel-density converting means comprises:
    conversion-pixel position-detecting means for detecting the conversion-pixel position, on the basis of the pixel-density conversion ratio data selected by said selection means, in synchronism with transmission of each pixel of the image data, and for outputting conversion-pixel position data;
    reference-pixel extracting means for extracting a reference pixel from the image data, and outputting reference pixel data;
    conversion-pixel density operating means for receiving the position data output from said conversion-pixel position-detecting means and the reference pixel data output from said reference-pixel extracting means, calculating the conversion-pixel density, on the basis of the input data, and outputting a calculated result as a conversion-pixel density value; and binary-encoding means for receiving the conversion-pixel density value output from said conversion-pixel density operating means, and binary-encoding the conversion-pixel density value.

6. The apparatus according to claim 5, wherein said pixel-density converting means includes threshold-value setting means for receiving the reference pixel data output from said reference-pixel extracting means, and setting a threshold value on the basis of the reference pixel data; and said binary-encoding means binary-encodes the conversion-pixel density value generated by said conversion-pixel density operating means, on the basis of the threshold value set by said threshold-value setting means.

7. The apparatus according to claim 6, wherein said pixel-density converting means converts main scanning and subscanning pixel densities of the image data, received by said input means, to the predetermined pixel densities, on the basis of the pixel-density conversion ratio data output from said selection means.

8. An image-resolution conversion apparatus for converting a pixel-density of an image data, comprising:
input means for receiving image data having different pixel densities along main scanning and subscanning directions;
selection means, having a plurality of pixel-density conversion ratio data items representing ratios of pixel-density conversion for converting the pixel densities of the image data to predetermined identical pixel density along the main scanning and subscanning directions, for selecting the pixel-density conversion ratio data on the basis of the pixel-densities of the image data received by said input means, the predetermined identical pixel density being different from that of the image data; and
pixel-density converting means, receiving the image data received by said input means and the pixel-density conversion ratio data output from said selection means, for performing a predetermined arithmetic operation on the basis of the pixel-density conversion ratio data from said selection means to convert the main scanning and subscanning pixel densities of the image data to the predetermined pixel density.

9. The apparatus according to claim 8, wherein said pixel-density converting means comprises:
conversion-pixel position-detecting means for detecting the conversion-pixel position, on the basis of the pixel-density conversion ratio data selected by said selection means, in synchronism with transmission of each pixel of the image data, and for outputting conversion-pixel position data;
reference-pixel extracting means for extracting a reference pixel from the image data, and outputting the reference pixel data;
conversion-pixel density operating means for receiving the position data output from said conversion-pixel position-detecting means and the reference pixel data output from said reference-pixel extracting means, calculating the conversion-pixel density, on the basis of the input data, and outputting a calculated result as a conversion-pixel density value; and
binary-encoding means for receiving the conversion-pixel density value output from said conversion-pixel density operating means, and binary-encoding the conversion-pixel density value.

10. The apparatus according to claim 9, wherein said pixel-density converting means includes threshold-value setting means for receiving the reference pixel data output from said reference-pixel extracting means, and setting a threshold value on the basis of the reference pixel data; and said binary-encoding means binary-encodes the conversion-pixel density value generated by said conversion-pixel density operating means, on the basis of the threshold value set by said threshold-value setting means.

11. A printer apparatus comprising:
printing means;
input means for receiving image data items of different pixel densities;
selection means, having a plurality of pixel-density conversion ratio data items representing ratios of pixel-density conversion for converting a pixel-density of the image data to be a predetermined pixel density matching that of said printing means, for selecting predetermined pixel-density conversion ratio data on the basis of the pixel density of the image data received by said input means; and
pixel-density converting means, receiving the image data received by said input means and the pixel-density conversion ratio data output from said selection means, for performing a predetermined arithmetic operation on the basis of the pixel-density conversion ratio data output from said selection means, and converting the image data received by said input means to image data having the predetermined pixel density.

12. The apparatus according to claim 11, wherein said output means is connected to a plurality of image data-output devices for outputting image data items of different pixel densities, and selectively receives the image data from one of said plurality of image data-output devices;
said printer apparatus further comprises discriminating means for determining which one of the image data-output devices has output the image data; and
said selection means selects the pixel-density conversion ratio data according to a discrimination result of said discriminating means.

13. The apparatus according to claim 12, wherein said pixel-density converting means comprises:
conversion-pixel position-detecting means for detecting the conversion-pixel position, on the basis of the pixel-density conversion ratio data selected by said selecting means, in synchronism with transmission of each pixel of the image data, and for outputting conversion-pixel position data;
reference-pixel extracting means for extracting a reference pixel from the image data, and outputting the reference pixel data;
conversion-pixel density operating means for receiving the position data output from said conversion-pixel position-detecting means and the reference pixel data output from said reference-pixel extracting means, calculating the conversion-pixel density, on the basis of the input data, and outputting a calculated result as a conversion-pixel density value; and
binary-encoding means for receiving the conversion-pixel density value output from said conversion-pixel density operating means, and binary-encoding the conversion-pixel density value.

14. The apparatus according to claim 13, wherein said pixel-density converting means includes threshold-value setting means for receiving the reference pixel data output from said reference-pixel extracting means, and setting a threshold value on the basis of the reference pixel data; and said binary-encoding means binary-encodes the conversion-pixel density value generated by said conversion-pixel density operating means, on the basis of the threshold value set by said threshold-value setting means.

15. The apparatus according to claim 14, wherein said pixel-density converting means converts main scanning and subscanning pixel densities of the image data, received by said input means, to the predetermined pixel densities, on the basis of the pixel-density conversion ratio data output from said selection means.

16. A printer apparatus comprising:
printing means;
input means for receiving image data whose main scanning and subscanning pixel densities are different;
selection means, having a plurality of pixel-density conversion ratio data items representing ratios of pixel-density conversion for converting the pixel densities of the image data to a predetermined identical pixel density matching that of said printing means for selecting the predetermined pixel-density conversion ratio data on the basis of the pixel density of the image data received by said input means, at least one of the main scanning and sub-scanning pixel densities being different from the predetermined identical pixel density; and
pixel-density converting means, receiving the image data received by said input means and the pixel-density conversion ratio data output from said selection means, for performing a predetermined arithmetic operation on the basis of the pixel-density conversion ratio data output from said selection means, and converting the image data received by said input means to image data having the predetermined identical pixel density; and
output means, connected to said pixel-density converting means, for outputting to said printing means the image data whose pixel density has been converted.

17. The apparatus according to claim 16, wherein said pixel-density converting means comprises:
conversion-pixel position-detecting means for detecting the conversion-pixel position, on the basis of the pixel-density conversion ratio data selected by said selection means, in synchronism with transmission of each pixel of the image data, and for outputting conversion-pixel position data;
reference-pixel extracting means for extracting a reference pixel from the image data, and outputting the reference pixel data;
conversion-pixel density operating means for receiving the position data output from said conversion-pixel position-detecting means and the reference pixel data output from said reference-pixel extracting means, calculating the conversion-pixel density, on the basis of the input data, and outputting a calculated result as a conversion-pixel density value; and
binary-encoding means for receiving the conversion-pixel density value output from said conversion-pixel density operating means, and binary-encoding the conversion-pixel density value.

18. The apparatus according to claim 17, wherein said pixel-density converting means includes threshold-value setting means for receiving the reference pixel data output from said reference-pixel extracting means, and setting a threshold value on the basis of the reference pixel data; and said binary-encoding means binary-encodes the conversion-pixel density value generated by said conversion-pixel density operating means, on the basis of the threshold value set by said threshold-value setting means.

19. A method of converting a pixel density of image data, comprising the steps of:
receiving image data items of different pixel densities;
selecting and outputting one of a plurality of stored pixel-density conversion ratio data items representing ratios each for pixel-density conversion, for converting a pixel density of the image signal to a predetermined pixel density different from that of the image data; and
performing a predetermined arithmetic operation on the basis of the pixel-density conversion ratio data, and converting the image data into image data having the predetermined pixel density.

20. The method according to claim 19, wherein the step of converting the pixel density comprises the steps of:
detecting a conversion-pixel position, on the basis of the pixel-density conversion ratio data, in synchronism with transmission of each pixel of the image data;
extracting a reference pixel from the image data;
calculating a density of the conversion pixel according to the position data and the reference pixel data, and obtaining a conversion-pixel density value; and
binary-encoding the conversion-pixel density value.

21. The method according to claim 20, wherein the step of converting the pixel density further includes the step of setting a threshold value according to the reference pixel data, and the step of binary-encoding the conversion-pixel density value comprises the step of binary-encoding the conversion-pixel density value, on the basis of the threshold value.

22. The method according to claim 19, wherein the image data is selectively output from one of a plurality of image data-output devices for outputting image data items of different pixel densities, said method includes a discriminating step for determining which one of said plurality of image data-output devices has output the image data, and the selection step comprises the step of selectively outputting the pixel-density conversion ratio data on the basis of a discrimination result obtained in the discrimination step.

23. The method according to claim 22, wherein the step of converting the pixel density comprises the steps of:
detecting a conversion-pixel position, on the basis of the pixel-density conversion ratio data, in synchronism with transmission of each pixel of the image data;
extracting a reference pixel from the image data;
calculating a density of the conversion pixel according to the position data and the reference pixel data, and obtaining a conversion-pixel density value; and
binary-encoding the conversion-pixel density value.

24. The method according to claim 23, wherein the step of converting the pixel density further includes the step of setting a threshold value according to the reference pixel data, and the step of binary-encoding the conversion-pixel density value comprises the step of binary-encoding the conversion-pixel density value, on the basis of the threshold value.

* * * * *